(12) United States Patent
Kunimi et al.

(10) Patent No.: US 7,241,816 B2
(45) Date of Patent: *Jul. 10, 2007

(54) EXPANDABLE STYRENE RESIN PARTICLES, EXPANDABLE BEADS, AND FOAMED ARTICLE

(75) Inventors: Makoto Kunimi, Ichihara (JP); Tetsuya Katou, Ichihara (JP); Makoto Saitou, Ichihara (JP); Hiroshi Nakaguki, Ichihara (JP); Toshio Akima, Ichihara (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/901,970

(22) Filed: Jul. 30, 2004

(65) Prior Publication Data

US 2005/0004241 A1    Jan. 6, 2005

Related U.S. Application Data

(63) Continuation of application No. 10/430,409, filed on May 7, 2003, now Pat. No. 6,797,733.

(30) Foreign Application Priority Data

| May 8, 2002 | (JP) | ............................. 2002-132623 |
| May 8, 2002 | (JP) | ............................. 2002-132624 |
| Aug. 22, 2002 | (JP) | ............................. 2002-242015 |
| Aug. 22, 2002 | (JP) | ............................. 2002-242016 |
| Sep. 26, 2002 | (JP) | ............................. 2002-280359 |
| Dec. 27, 2002 | (JP) | ............................. 2002-381173 |

(51) Int. Cl.
*C08J 9/00* (2006.01)
*C08J 9/16* (2006.01)

(52) U.S. Cl. .......................................... 521/56; 521/60
(58) Field of Classification Search .................. 521/56, 521/60

See application file for complete search history.

(56) References Cited

FOREIGN PATENT DOCUMENTS

| JP | 05-295160 | 11/1993 |
| JP | 7-188454 | 7/1995 |
| JP | 7188454 | 7/1995 |
| JP | 07-330943 | 12/1995 |
| JP | 8295756 | 11/1996 |

*Primary Examiner*—Irina S. Zemel
(74) *Attorney, Agent, or Firm*—Antonelli, Terry, Stout & Kraus, LLP.

(57) ABSTRACT

A process of producing expandable styrene resin particles, wherein in suspension polymerization of styrene monomers, the concentration of oxygen in a reaction vessel is kept low at least in a late stage of the polymerization, and the resulting styrene resin particles are impregnated with an expanding agent before or after completion of the polymerization. Preferably, at a polymerization rate of 60% or higher, the concentration of oxygen in the reaction vessel is kept at 7 volt % or lower. When additional styrene monomers are added during the polymerization, they are added and adsorbed to styrene resin particles in the course of polymerization while the concentration of oxygen is kept low. By this method, the particles whose internal portion has a low molecular weight and surface portion has a high molecular weight are obtained. A foamed article produced from the particles has high strength and a good appearance.

2 Claims, 6 Drawing Sheets

(a)

(b)

(a)

(b)

(c)

(a)

(b)

EXPANDABLE STYRENE RESIN PARTICLES, EXPANDABLE BEADS, AND FOAMED ARTICLE

This application is a continuation application of U.S. application Ser. No. 10/430,409, filed May 7, 2003 now U.S. Pat. No. 6,797,733 the contents of which are incorporated herein by reference.

BACKGROUND OF THE INVENTION (i) Field of the Invention

The present invention relates to expandable styrene resin particles and a production process thereof, expandable styrene beads, and a foamed article.

(ii) Description of the Related Art

An expandable styrene resin is used for a number of food containers, packing materials, cushioning materials and others by taking advantage of its excellent heat insulation properties, economy and sanitation. A foamed article thereof is produced by heating particles of the expandable styrene resin by steam or the like to be pre-foamed to a desired bulk density, subjecting the particles to an aging step, and filling the resulting particles into a mold to be foamed under heating again. The expandable styrene resin particles are required to have excellent expandability in the pre-expanding step or the expand-molding step in the mold under heating and to have high strength or an excellent appearance when molded into an article.

Heretofore, to enhance the strength of the foamed article, some methods has been investigated, for example, increasing of the density of a molded article, or increasing of the thickness of the molded article itself. However, any of these methods can be hardly considered to be economical since the weight of the molded article increases and also have problems from an environmental standpoint. As for the expandable styrene resin particles, some methods has been investigated, for example, increasing the molecular weight, or controlling or reducing a kind or an amount of plasticizer for plasticizing the resin particles.

On the other hand, to improve the expandability of the expandable styrene resin particles, a method of decreasing the molecular weight, a method of plasticizing the resin particles, a method of changing a composition ratio of expanding agents and other methods have been investigated.

Such methods of enhancing the strength of the foamed article and such methods of improving the expandability are generally contradictory to each other, and hence, it has been difficult to simultaneously satisfy both the methods.

For solving these problems, resin particles, whose outermost layer portion and central portion have a low molecular weight and middle portion has a high molecular weight, are proposed in Japanese Patent Laid-Open No. 295756/1996.

However, the above particles have a problem that since the molecular weight of the outermost layer portion is low like the central portion, thermal fusion is promoted excessively at the time of heat-expand-molding, thereby degrading a surface finish of a molded article.

Further, in Japanese Patent Laid-Open No. 188454/1995, resin particles whose surface layer portion has a higher molecular weight than that of the whole particle are disclosed.

It is described in this publication that when the surface layer portion has an excessively high molecular weight, the expandability deteriorates and the appearance of the resulting molded article is degraded with a lower strength. This is assumed to be because the molecular weight of the central portion of the particles disclosed therein also becomes high as the molecular weight of the surface layer portion becomes high. That is, the above resin particles have a problem that the molecular weight of the surface layers cannot be sufficiently increased.

Further, heretofore, to obtain the foamed articles having a good appearance, it was essential to eliminate gaps among beads completely when styrene beads filled in a mold are foamed under heating. However, it was difficult to eliminate all gaps among the beads. Under the circumstances, to eliminate as many voids as possible, the properties of expandable styrene resin particles themselves and molding techniques including the functions of molding machines and the like have been improved.

For example, to improve the properties of the expandable styrene resin particles themselves, efforts were made to control the type and amount of plasticizer for plasticizing the resin particles, or to render the molecular weight lower. However, these methods lead to a reduction in the heat resistance of the resin particles and have a problem that the surface of a molded article is molten by heat-expanding at the time of molding, thereby increasing voids.

Further, to improve molding techniques including the functions of molding machines and the like, the following have been studied. As for the molding machines, a control method in a heating step has been studied, and a method of using steam more efficiently was employed. As for molds, a method of using steam more effectively by, for instance, increasing the number of slits has been studied. However, these methods have problems that additional costs including costs for improving the machines and the molds are so large and it is difficult to improve all of these at once.

SUMMARY OF THE INVENTION

An object of the present invention is to provide expandable styrene resin particles capable of forming a molded article having high strength and having excellent expandability, expandable beads, and a foamed article.

Further, another object of the present invention is to provide expandable styrene resin particles capable of forming a molded article having a good appearance and having excellent expandability, expandable beads, and a foamed article.

A process for producing expandable styrene resin particles according to the present invention is characterized in that in suspension polymerization of styrene monomers, the polymerization reaction is allowed to proceed, keeping the concentration of oxygen in a reaction vessel low at least in the late stage of the polymerization.

The process can prevent decreases in molecular weight of a surface portion.

In the process of the present invention, the polymerization may be carried out with seeds.

Further, the addition of styrene monomers in the late stage of polymerization leads to higher molecular weight of a surface portion, improving the strength of a molded article. The polymerization may be carried out without the addition of monomers.

When adding styrene monomers in the late stage of the polymerization, they are added while the concentration of oxygen is kept low.

For example, according to one embodiment of the process of the present invention, in a suspension polymerization of styrene monomers, when a rate of polymerization is at least 60%, additional styrene monomers are added and adsorbed to styrene resin particles in the course of polymerization while the concentration of oxygen in a reaction vessel is kept at 7 vol % or lower so as to allow a polymerization reaction to proceed, and the particles are impregnated with an expanding agent before or after completion of the polymerization reaction.

By this method, the following expandable styrene resin particles can be obtained.

1. An expandable styrene resin particle, wherein the weight average molecular weight of a surface portion from the surface of the particle to a depth of 1/5 of its radius toward the center is higher than that of a central portion from the center to a distance of 1/5 of the radius toward the surface, and a chart of gel permeation chromatography of the surface portion has two crests or a shoulder.

2. The particle of the paragraph 1, wherein the weight average molecular weight of the central portion is 200,000 to 300,000, the weight average molecular weight of the surface portion is 300,000 to 450,000, and the weight average molecular weight of the surface portion is at least 1.2 times as large as that of the central portion.

3. An expandable styrene resin particle, wherein the weight average molecular weight of a resin portion forming 30 to 60 wt % from the center toward the surface of the particle is 200,000 to 300,000, the weight average molecular weight of a resin portion forming 60 to 30 wt % from the surface toward the center of the particle is 300,000 to 450,000, and the weight average molecular weight of the surface portion forming 60 to 30 wt % of the particle is 1.2 to 2.2 times as large as that of the central portion forming 30 to 60 wt % of the particle.

4. An expandable styrene resin particle, wherein the inclination of a correlation expression of a logarithm (R.M.S radius) and a logarithm (MW), measured by a GPC/MALLS method, of a surface portion from the surface of the particle to a depth of 1/5 of the radius toward the center is not larger than 0.53.

Further, according to another embodiment of the process of the present invention, in suspension polymerization of styrene monomers, the concentration of oxygen in a reaction vessel is kept at 1 vol % or lower during from the start of polymerization to the addition of additional styrene monomers in the course of polymerization at a polymerization rate of 60% or higher.

According to this method, the following expandable styrene resin particles can be obtained.

1. An expandable styrene resin particle, wherein when a surface portion from the surface of the particle to a depth of 1/5 of the radius toward the center is further divided into 6 equal portions from the surface toward the center of the particle, the weight average molecular weights of parts constituting from the surface to the 1/6 to 6/6 portions do not decrease toward the surface of the particle.

2. The particle of the paragraph 1, wherein a ratio (B)/(A)×100(%) is at least 130 wherein (B) is the weight average molecular weight of the outermost portion out of the 6 equal portions, and (A) is the weight average molecular weight of the whole particle.

3. An expandable styrene resin particle, wherein a chart of gel permeation chromatography of a surface portion from the surface of the particle to a depth of 1/5 of the radius toward the center has two crests or a shoulder, and a ratio (B)/(A)×100(%) is at least 130 wherein (B) is the weight average molecular weight of an outermost portion out of 6 equal portions obtained by dividing the surface portion into the 6 equal portions from the surface toward the center of the particle, and (A) is the weight average molecular weight of the whole particle.

4. An expandable styrene resin particle obtained by suspension-polymerizing styrene monomers and impregnating a styrene resin particle with an easily evaporating expanding agent before or after completion of the polymerization, wherein a ratio (B)/(A)×100(%) is larger than 130 but not larger than 200 wherein (B) is the weight average molecular weight of a resin component forming up to 10 wt % from the surface toward the center of the particle, and (A) is the weight average molecular weight of the whole particle.

DETAILED DESCRIPTION OF THE PREFERRED EMBODIMENTS

Figure 1:
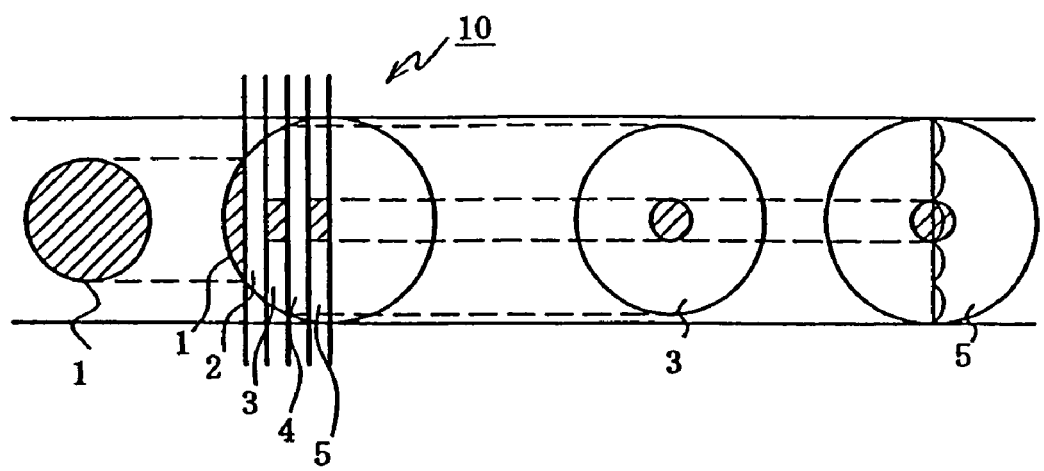
FIG. 1 is a diagram for explaining a method of measuring the molecular weights of 5 equally divided portions of a particle.

The expandable styrene resin particles of the present invention can be obtained by polymerizing styrene monomers. As the styrene monomers, styrene itself or mixed monomers comprising styrene as an essential component, and a styrene derivative such as a-methylstyrene, chlorstyrene or vinyltoluene, an acrylic ester such as methyl acrylate, ethyl acrylate or butyl acrylate, or a methacrylic ester such as methyl methacrylate, ethyl methacrylate or butyl methacrylate can be used. Further, a crosslinking agent such as divinylbenzene or diallyl phthalate can be used.

A process for producing the expandable styrene resin particles is preferably suspension polymerization, and a conventionally known process can be employed. The polymerization is generally carried out by dispersing styrene monomers having a catalyst such as an organic peroxide dissolved therein into an aqueous medium containing a dispersant so as to produce radicals.

As the dispersant, a hardly soluble inorganic salt and a surfactant may be used in combination or a conventionally known dispersant such as an organic dispersant, e.g., PVA can also be used.

As the hardly soluble inorganic salt, magnesium phosphate, tricalcium phosphate and the like can be used. As the surfactant, sodium oleate, sodium dodecylbenzenesulfonate as well as an anionic surfactant and a nonionic surfactant which are generally used in suspension polymerization can be used. As the organic dispersant, a polyvinyl alcohol, a polyvinyl pyrrolidone, methylcellulose and the like can be used.

As the organic peroxide, a conventionally known organic peroxide having a 10-hour half decomposition temperature of 50 to 100° C. can be used. For example, lauroyl peroxide, benzoyl peroxide, t-butyl peroxybenzoate, t-butylperoxyisopropyl carbonate and the like can be used. The organic peroxide is preferably used in an amount of 0.001 to 0.5 wt % based on the polymerizable monomer. One or two or more organic peroxides can be used.

The molecular weight of the whole resin particles can be controlled by adjustment of the concentration of the catalyst, the use of a chain transfer agent, or both of these.

As the chain transfer agent, conventionally known chain transfer agents such as octyl mercaptan, dodecyl mercaptan, an α-methylstyrene dimer and the like can be used. The chain transfer agent is preferably used in an amount of 20 to 100 ppm based on the polymerizable monomers.

In the process of producing the present invention, a reaction is allowed to proceed, keeping the concentration of oxygen in a reaction vessel low at least in the late stage of polymerization, and the resulting styrene resin particles are impregnated with an easily evaporating expanding agent before or after completion of the polymerization reaction.

In this process, the concentration of oxygen in the reaction vessel may be kept low from the start or in the middle of the polymerization, and the concentration of oxygen must be low at least in the late stage of the polymerization.

In general, when the polymerization proceeds with oxygen present in the reaction vessel, the amount of low-molecular-weight products formed in styrene resin particles increases. Particularly, since the amount of residual polymerization catalyst is small and radicals are stopped in the late polymerization stage, the low-molecular-weight products are liable to be produced on the surface of the styrene resin particles, thereby impairing the appearance of a molded article.

Meanwhile, in the production process of the present invention, since the concentration of oxygen in the reaction vessel is kept low in the late polymerization stage, the occurrence of such low-molecular-weight products can be inhibited. The concentration of oxygen is kept at preferably 7 vol % or lower, more preferably 5 vol % or lower, particularly preferably 1 vol % or lower. The concentration of oxygen can be controlled by substitution with an inert gas such as nitrogen.

Further, the late polymerization stage is a stage with a polymerization rate of preferably not lower than 60%, more preferably not lower than 60% but lower than 97%.

According to a first production process of the present invention, in suspension polymerization, additional styrene monomers are added at a polymerization rate of not lower than 60%, preferably not lower than 60% but lower than 97%, while the concentration of oxygen in a reaction vessel is kept at 7 vol % or lower.

If the styrene monomers are added while the concentration of oxygen is higher than 7 vol %, low-molecular-weight products may be produced in the surface layer of styrene resin particles. The low-molecular-weight products produced in the surface promote thermal fusion at the time of heat-expand-molding excessively, thereby. degrading the strength and surface finish of a molded article.

Further, according to a second production process of the present invention, in suspension polymerization, the concentration of oxygen in a reaction vessel is kept at 1 vol % or lower during from the start of polymerization to a polymerization rate of not lower than 60%, preferably not lower than 60% but lower than 97%, and additional styrene monomers are added at the polymerization rate of not lower than 60%, preferably not lower than 60% but lower than 97%.

In this case, before the polymerization starts, oxygen in the reaction vessel is substituted with nitrogen or the like so as to adjust the concentration of oxygen in the reaction vessel to 1 vol % or lower in advance. The lower the concentration of oxygen is, the more preferable it is. Thereafter, to allow the polymerization to proceed, feeding of nitrogen or the like into the reaction vessel may be continued or the reaction vessel may be sealed after completion of substitution so as to prevent oxygen from entering the reaction vessel.

When the polymerization proceeds in a sealed reaction vessel, oxygen contained in water and styrene monomers, oxygen trapped in a liquid by agitation and oxygen produced at the time of the polymerization reaction are generated along with an increase in the temperature of the polymerization reactants from a feed temperature to a reaction temperature or along with a reaction of a polymerization catalyst. Hence, when the concentration of oxygen exceeds 1 volt, oxygen is substituted with nitrogen or the like again.

The concentration of oxygen in the reaction vessel is controlled to be at 1 vol % or lower until addition of an additional styrene monomers is completed. To keep the concentration of oxygen at 1 vol % or lower during the polymerization, the connection of an oximeter is recommended.

When the concentration of oxygen is 1 vol % or lower, the molecular weight becomes further higher, whereby the strength of a molded article can be rendered high.

When the polymerization rate is lower than 60%, absorption of the styrene monomers into the styrene resin particles is promoted, and the molecular weight of the central portion becomes high, whereby an expanding force and fusion of the molded article may deteriorate. Meanwhile, when the polymerization rate is equal to or higher than 97%, absorption of the styrene monomers into the resin particles lowers, the amounts of radicals and polymerization catalyst in the resin particles decrease, and the molecular weight of the outermost portion of resin particles becomes low, so that thermal fusion at the time of expand-molding is promoted excessively, whereby the strength and surface finish of the molded article may be degraded. Addition of the monomers at a polymerization rate of not lower than 85% but lower than 97% is more preferable.

The styrene monomers are preferably added in an amount of 5 to 30 wt %, more preferably 10 to 15 wt %, based on finally obtained styrene resin particles.

When the amount is smaller than 5 wt %, the molecular weight of the outermost portion of the styrene resin particles may not be sufficiently high. As a result, the strength may not be improved sufficiently. Meanwhile, when the amount is larger than 30 wt %, the resin particles may be softened, absorption of the styrene monomers may be promoted, and the molecular weight of the central portion of particles may become higher, i.e., a part with the highest molecular weight may be closer to the central portion of the particles, so that an expanding force lowers and an molded article may hardly be fused accordingly.

The suspension polymerization temperature is generally 80 to 95° C. The additional styrene monomers may be added at the temperatures or at higher temperatures. In consideration of the industrial production efficiency that the amount of styrene monomers remaining in the finally obtained expandable styrene resin particles is reduced, the polymerization temperature is preferably not lower than 90° C., and the styrene monomers are preferably added during temperature increasing.

According to a third production process of the present invention, in suspension polymerization, a reaction is allowed to proceed, keeping the concentration of oxygen in a reaction vessel at 7 vol % or lower from the start of polymerization, and no styrene monomers are added in the middle of the polymerization.

In the production process of the present invention, it is preferred that the polymerization be started when a hydrogen ion concentration in an aqueous dispersion is 8 to 10 and an additional hardly soluble inorganic salt be added at least once at a polymerization rate of 20 to 50%. The aqueous dispersion is preferably a continuous phase.

When the hydrogen ion concentration is out of the above range, particle size distribution at the completion of the suspension polymerization may not be sharp. The hydrogen ion concentration can be adjusted by use of a basic inorganic salt.

Further, due to the same reason, an additional hardly soluble inorganic salt can be added at a polymerization rate of 20 to 50%.

The hardly soluble inorganic salt can be additionally added at least once, e.g., two or three times. Further, the hardly soluble inorganic salt can be additionally added after the polymerization further proceeds.

An easily evaporating expanding agent can be added under pressure along with addition of the styrene monomers. However, in general, the easily evaporating expanding agent is preferably added after addition of the styrene monomers, and it is preferred that the styrene resin particles be impregnated with the easily evaporating expanding agent before or after completion of a polymerization reaction.

The easily evaporating expanding agent is selected from aliphatic hydrocarbons such as propane, isobutane, normal butane, isopentane, normal pentane and cyclopetane. Further, as an expanding assistant, an alicyclic or aromatic hydrocarbon such as cyclohexane can be used in combination with the easily evaporating expanding agent in addition to an aliphatic hydrocarbon.

In the polymerization, additives used in production of expandable styrene resin particles, such as a solvent, a plasticizer, an expandable cell nucleating agent, a filler, a flame retardant, a flame retardant assistant, a lubricant and a colorant may be used as required.

Further, in the production process of the present invention, a seed polymerization process using expandable styrene resin particles or regenerated styrene resin particles as seeds can also be employed. In this process as well, the concentration of oxygen is controlled to be low, as described above.

After impregnated with the expanding agent, discharged from the polymerization system and dried through dehydration, the expandable styrene resin particles may be coated with a surface coating agent as required. As the coating agent, a conventionally known coating agent which has been applied to expandable styrene resin particles can be employed. Illustrative examples of such a coating agent include zinc stearate, triglyceride stearate, monoglyceride stearate, a castor hardened oil, an amide compound, silicones, and an antistatic agent.

In general, the weight average molecular weight (molecular weight) of the expandable styrene resin particles produced by suspension polymerization is determined by the amount of polymerization catalyst, and the molecular weights of the central, middle and surface-layer portions of particles are approximately the same.

However, according to the foregoing first production process of the present invention, expandable styrene resin particles whose surface portions have a higher molecular weight than these central portions are obtained. The gradient of the molecular weight from the center to the surface of particles is not a gradual increase at a given rate, but the molecular weight sharply increases near the surface.

The expandable styrene resin particles obtained by the production process of the present invention has a much higher molecular weight near the surface than the rest of the particle. Therefore, it can have a high molecular weight in the surface portion with the molecular weight of the central portion kept low. In general, when the central portion has a low molecular weight, good expandability can be exhibited, while when the surface portion has a high molecular weight, a molded article has high strength. Thus, the particles of the present invention can satisfy both expandability and the strength of a molded article. For example, a molded article having relatively high strength can be obtained with a certain degree of expandability maintained.

In particular, the expandable styrene resin particles can be obtained in which the weight average molecular weight of a surface portion from the surface of the particles to a depth of ⅕ of the radius toward the center is higher than that of a central portion from the center to a distance of ⅕ of the radius toward the surface.

Next, the surface portion and the central portion will be described with reference to FIG. 1. As shown in FIG. 1, a resin particle 10 is divided into 5 equal portions from the surface toward the center. An outermost portion 1 out of the 5 portions is the surface portion. The weight average molecular weight of the surface portion is that of the portion 1. An innermost portion 5 out of the 5 portions is the central portion. The weight average molecular weight of the central portion is that of a middle portion out of 5 equally divided portions of the portion 5.

Figure 5:
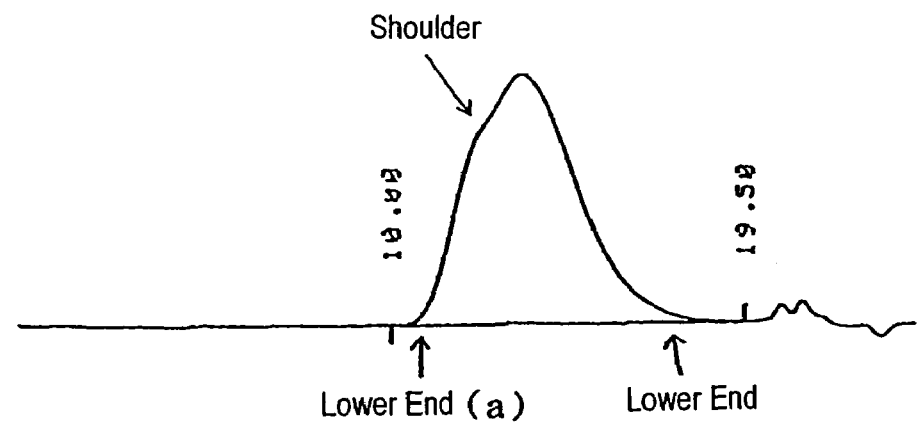
FIG. 5 is GPC charts of particles obtained in Examples 1 and 2 and Comparative Example 1.
Figure 5:
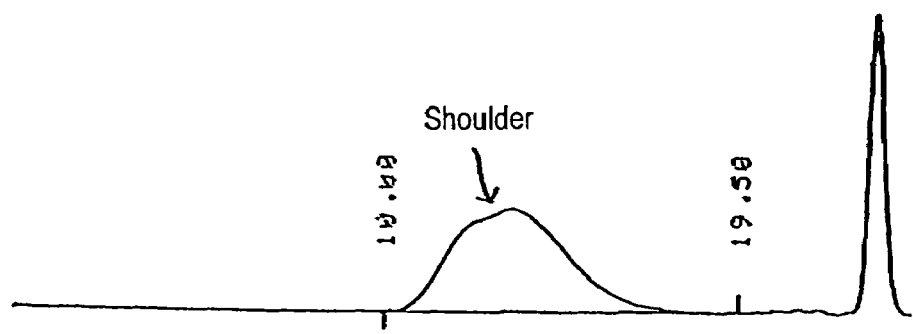
Figure 5:
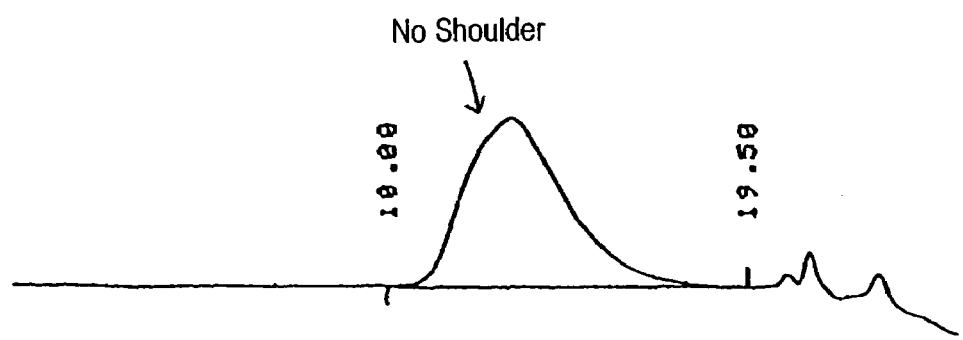
Figure 7:
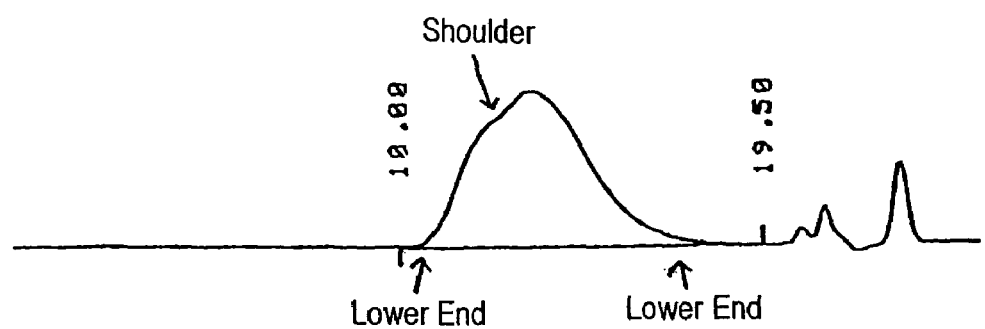
FIG. 7 is GPC charts of particles obtained in Examples 13 and 15.
Figure 7:
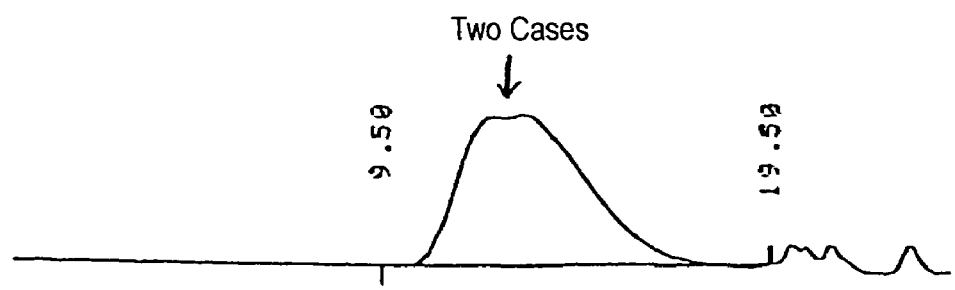

Further, it is preferred that a chart of gel permeation chromatography of the surface portion have two crests or a shoulder. Having the two mountains or shoulder indicates that the molecular weight is changing abruptly. The shoulder is formed by an inflection point. In the present invention, the chart by gel permeation chromatography is measured by use of two GL-R400M columns of Hitachi Chemical Co., Ltd. Referring to FIGS. 5 and 7, although the chart generally has inflection points at both lower ends as well, the present invention does not count these points as shoulders.

Further, in the present invention, it is preferred that the weight average molecular weight of the central portion be 200,000 to 300,000, the weight average molecular weight of the surface portion be 300,000 to 450,000 and the weight average molecular weight of the surface portion be at least 1.2 times as large as that of the central portion.

When the molecular weight of the central portion is smaller than 200,000, the strength of a molded article may be low. Further, to render the molecular weight smaller than 200,000, the amount of catalyst used in a production process must be increased disadvantageously.

Meanwhile, when the molecular weight of the central portion is larger than 300,000, expandability may be low.

Further, the weight average molecular weight of the central portion is preferably 200,000 to 250,000. The molecular weights of the three innermost portions out of the 5 portions are preferably substantially the same.

When the molecular weight of the surface portion is smaller than 300,000, a molded article may not be able to have sufficient strength.

When the molecular weight of the surface portion is larger than 450,000, an expanding force may lower, thermal fusion may not proceed, the surface finish of the molded article may become poor, and fusion hardly occurs.

Further, the weight average molecular weight of the surface portion is preferably 350,000 to 450,000.

The ratio of the weight average molecular weight of the surface portion to that of the central portion is more preferably at least 1.5, generally at most 2.2.

Further, according to the production process of the present invention, grafting which has been conceived not to occur in conventional radical polymerization of styrene occurs in the surface portion, whereby a high-molecular-weight branching structure can be produced.

It can be known that the surface portion has the branching structure, because the inclination of a correlation expression of a logarithm (R.M.S radius) and a logarithm (MW), measured by a GPC/MALLS method, of the surface portion from the surface of the particle to a depth of ⅕ of the radius toward the center is not larger than 0.53, preferably not larger than 0.52, more preferably not larger than 0.50. In the above description, GPC stands for gel permeation chromatography, MALLS stands for Multi Angle Laser Light Scattering, an R.M.S radius refers to a Root Mean Square radius, and MW refers to an absolute molecular weight.

The above inclination is 0.55 to 0.60 for a linear polystyrene obtained by general radical polymerization (suspension-based).

Further, due to the same reason as above, the weight average molecular weight of the surface portion is preferably 300,000 to 450,000.

Further, according to the foregoing second production process of the present invention, a decrease in molecular weight at the end of a polymerization reaction, that is, in a portion near the surface, can be prevented by keeping the concentration of oxygen at 1 vol % or lower from the start of the polymerization to the late stage of the polymerization.

In particular, in the expandable styrene resin particles of the present invention, when a surface portion from the surface of a particle to a depth of ⅕ of the radius toward the center is further divided into 6 equal portions from the surface toward the center of the particle, the weight average molecular weights of parts constituting from the surface to the ⅙ to ⅚ portions preferably do not decrease toward the surface of the particle, more preferably increase toward the surface thereof.

Figure 2:
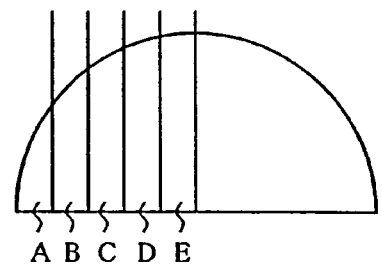
FIG. 2 is a diagram for explaining a method of measuring the molecular weights of 6 equally divided portions of the outermost portion out of 5 equally divided portions of a particle.
Figure 2:
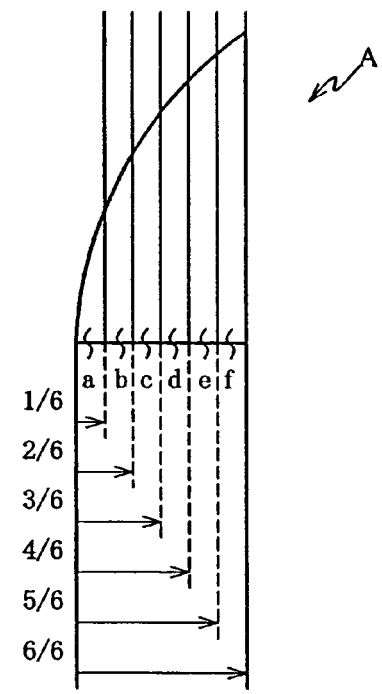

Next, the "parts constituting from the surface to the ⅙ to ⅚ portions" will be described with reference to FIG. 2. As shown in FIG. 2(a), firstly, a resin particle 10 is halved, and then a half thereof is divided into 5 equal portions from the surface toward the center. An outermost portion A out of the 5 equal portions is further divided into 6 equal portions as shown in FIG. 2(b). The above "parts constituting from the surface to the ⅙ to ⅚ portions" are the parts from the surface to these 6 portions respectively.

In the present invention, it is preferred that the weight average molecular weight (B) of the outermost portion out of the 6 equal portions be larger than that (A) of the whole resin particle. In particular, a ratio (B)/(A)×100(%) is more preferably at least 130. Further, the value is generally 200 or less.

In the present invention, the outermost portion out of the 6 equal portions generally corresponds to a resin component forming up to 10 wt % from the surface toward the center of the particle.

By making the molecular weight of the outermost portion relatively higher, the strength of a molded article can be further increased.

In the resin particles produced by the first and second production process, as described above, the occurrence of low-molecular-weight products in the surface portion is inhibited, and the surface portion has a high-molecular-weight branching structure. Hence, as compared with a foamed article produced by ordinary polymerization which does not control the concentration of oxygen, the heat resistance of the surface portion is improved, and a foamed article having a good appearance or good mechanical strength can be obtained.

Further, according to the third production process, expandable styrene resin particles in which the molecular weight of outermost portion does not decrease, even in terms of sizes of expandable cells in expandable styrene beads can be obtained. As a result, a foamed article with good appearance can be obtained.

The average particle diameter of the expandable styrene resin particles of the present invention is generally 0.05 to 2.0 mm.

Expandable beads of the present invention are produced by expanding the expandable styrene resin particles. Further, a foamed article of the present invention is produced by molding the above expandable beads.

In general, the expandable styrene resin particles are heated by steam or the like to be pre-foamed to a given bulk density and then subjected to an aging step to produce the expandable beads. Thereafter, the expandable beads are filled in a mold and foamed under heating again, thereby producing the expand-mold product.

In the present invention, the expandability of the expandable styrene resin particles and the strength of a molded article obtained therefrom are well-balanced. The molded article of the present invention can be suitably used in food containers, packing materials, cushioning materials, and the like.

According to the present invention, expandable styrene resin particles which can produce a molded article having high strength and has excellent expandability, expandable beads and a foamed article can be provided.

EXAMPLES

Methods of evaluating properties in examples and comparative examples are as follows.

(1) Weight Average Molecular Weight (Molecular Weight)

The molecular weight of expandable styrene resin particles was measured after expanding the particles. The expandable styrene resin particles were expanded in saturated steam to a bulk density of 80 ml/g.

<Method of Measuring Molecular Weights of 5 Equally Divided Portions of Particle>

Two or three expanded particles were picked. A half of a particle 1 was divided into 5 equal portions by use of a razor as shown in FIG. 1 so as to form portions 1, 2, 3, 4 and 5 from the surface. The molecular weight of the outermost portion 1 (surface portion) was measured as it was. As for the innermost portion 5 (central portion), the portion was divided into 5 equal portions, a middle portion was hollowed out by use of an injection needle, and the molecular weight of the hollowed portion was measured. As for the portion 3 (corresponding to ⅗ portion from the center), a middle portion was hollowed out by use of an injection needle as in the case of the portion 5, and the molecular weight of the hollowed portion was measured.

The molecular weights were measured in accordance with a gel permeation chromatography (GPC) method by use of the following devices and conditions. Further, a chart (GPC chart) of the surface portion was obtained.

Measuring Device: manufactured by HITACHI CO., LTD.
Eluant: THF, Flow Rate: 2 ml/min
Detector: UV 220 nm
Column: Two GL-R400M columns of HITACHI CHEMICAL CO., LTD.

<Method of Measuring Molecular Weights of 6 Equally Divided Portions of Surface Portion Out of 5 Equally Divided Portions of Particle (Examples 10 to 16 and Comparative Examples 1 and 4)>

The molecular weights of "parts constituting ⅙ to 6/6 from the surface" were measured in the following manner. As shown in FIG. 2(a), firstly, an expanded particle 10 was halved, and a half thereof was further divided into 5 equal portions from the surface toward the center. An outermost portion A from the surface to a depth of ⅕ was further cut into 6 equal portions under a microscope as shown in FIG. 2(b) so as to obtain portions a, b, c, d, e and f. The molecular weights of the portions a, b, c, d, e and f were measured. The molecular weight of the portion a was the molecular weight of a portion from the surface to a depth of ⅙. An average of the molecular weights of the portions a and b was the molecular weight of the portion from the surface to a depth of 2/6. An average of the molecular weights of the portions a, b and c is the molecular weight of the portion from the surface to a depth of 3/6. An average of the molecular weights of the portions a, b, c and d is the molecular weight of the portion from the surface to a depth of 4/6. An average of the molecular weights of the portions a, b, c, d and e is the molecular weight of the portion from the surface to a depth of 5/6. An average of the molecular weights of the portions a, b, c, d, e and f is the molecular weight of the portion from the surface to a depth of 6/6.

The molecular weights were measured by a GPC method as in the above case.

Method of Measuring Molecular Weight of Expandable Cell in Surface of Particle (Examples 17 and 18 and Comparative Example 5)>

Figure 3:
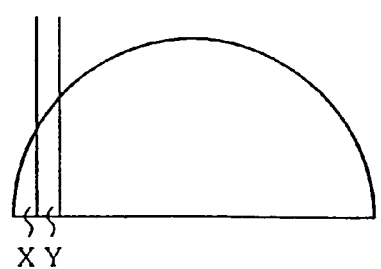
FIG. 3 is a diagram for explaining a method of measuring the molecular weight of an expandable cell in the surface of a particle.

5 or 6 expandable beads (average particle diameter: 3.0 mm) were prepared and halved. Then, as shown in FIG. 3, a layer portion X and a layer portion Y which had the same thickness corresponding to the size of one expandable cell were cut from the surface of a halved expandable bead toward its center under a microscope. The molecular weights of the outermost layer portion (layer portion X) and a surface layer portion (layer portion X+layer portion Y) were measured. The outermost layer portion is a portion having a thickness corresponding to the size of one expandable cell, and the surface layer portion is a portion having a thickness corresponding to the size of two expandable cells. The molecular weight of the surface layer portion was measured as an average of the molecular weights of the layer portions X and Y.

In the present examples, the size of one expandable cell of the outermost layer portion is about 50 to 100 µm, and the size of two expandable cells of the surface layer portion is about 100 to 200 µm.

The molecular weights were measured by a GPC method as in the above case.

(2) Expandability

To determine expandability, there was measured a bulk density (degree of expansion) when expandable styrene resin particles containing 7.0 wt % of an evaporating component were expanded in boiling water at 100° C. for 3 minutes.

(3) Flexural Strength

Expandable styrene resin particles were expanded by use of an HBP-700 expanding machine of HITACHI TECHNO-PLANT CO., LTD. to obtain expandable beads. Then, the expandable beads were molded by use of a VS-500 molding machine of DAISEN KOUGYO CO., LTD. at a steam pressure of 0.08 MPa to obtain a molded article having a size of 550 mm×335 mm×150 mm.

The flexural strength of the foamed article having a density of 60 ml/g was measured in accordance with JIS-A-9511.

(4) Analysis of polymer structure of surface portion by GPC/MALLS method

A surface portion 1 shown in FIG. 1 was used as a sample to be measured. The GPC/MALLS method was carried out by use of the following devices and conditions. In consequence, the inclination of a correlation expression of a logarithm (R.M.S radius) and a logarithm (MW) was determined.

Column: Shodex, KF-807L (×2)
Column Temperature: 40° C.
Eluant: THF
Flow Rate: 1.00 ml/min
Amount of Injection: 100 µL
Detector: RI and Wyatt Technology, DAWN DSP-F
  (Laser Wavelength: 632.8 nm)
Multi Angle Fitting Method: Berry Method (5) Appearance (Smoothness of Surface)

Black printing ink was applied thinly on the surface of a molded article produced in the same manner as in (3) by use of a roller, and the applied surface portion was subjected to an image processor. Since voids on the surface portion were not coated with the ink, the area of the black portion with respect to the whole applied area was determined as a degree of smoothness of the surface and a value for evaluating the appearance of the molded article.

(6) Rate of Polymerization

A rate of polymerization was measured by sampling resin particles during synthesis by use of the following devices and conditions.

Measuring Device: manufactured by HITACHI CO., LTD.
Eluant: acetonitrile/distilled water=70/30
Flow Rate: 1 ml/min
Detector: UV 230 nm
Column: Inertsil ODS-2

<Examples of keeping concentration of oxygen at 7 vol % or lower only in late stage of polymerization and adding additional monomers in late stage of polymerization>

Example 1

In a 14-liter autoclave equipped with an agitator, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 5,400 g of styrene, 22.0 g (Wet 75%) of benzoyl peroxide, 2.4 g of t-butyl peroxyisopropylcarbonate, and 3 g of ethylenebisamide were charged under agitation.

After completion of charging, the polymerization vessel was sealed. The vessel was then heated to 90° C., and 3 g of tricalcium phosphate was added two hours and three hours after completion of temperature rising, respectively. At these times, rates of polymerization were 40% and 46%, respectively.

Then, upon keeping the content of the vessel at 90° C. for 2 hours, 6 g of tricalcium phosphate and 0.3 g of sodium dodecylbenzenesulfonate were added again. A rate of polymerization at this time was 95%. The inside of the polymerization vessel was substituted with nitrogen at a rate of 200 to 300 ml/min for 10 minutes. The concentration of oxygen in the polymerization vessel at this time was 3.1 vol %. Thereafter, 600 g of styrene was added dropwise continuously over 3 hours while the temperature was raised to 100° C.

Then, 90 g of cyclohexane was added under pressure, and after 1 hour, 420 g of butane (isobutane/normal butane ratio=4/6) was added under pressure in 1 hour, and then the content of the vessel was kept for another 4 hours. Thereafter, the content was cooled to room temperature and then taken out of the autoclave.

After the taken out slurry was washed, dehydrated and dried, the resulting product was classified by passing through a 14 mesh and being caught in a 26 mesh and then coated with 0.08% of zinc stearate, 0.05% of castor hardened oil and 0.02% of dimethyl silicone to obtain expandable styrene resin particles.

Figure 4:
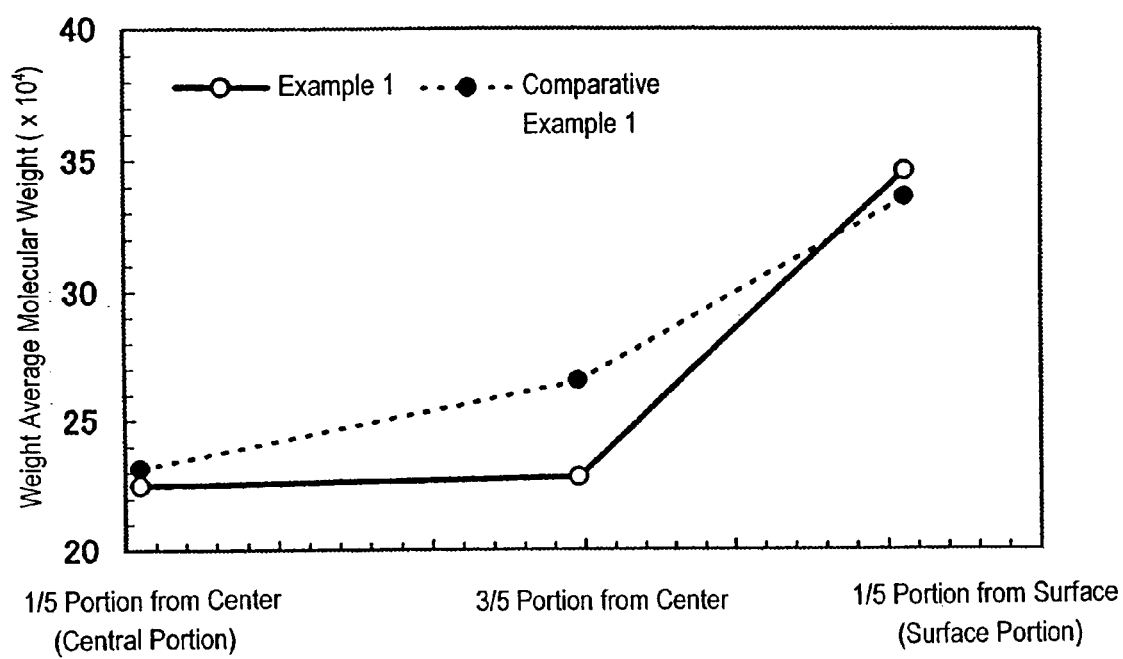
FIG. 4 is a graph showing changes in molecular weights from the center to the surface of particles obtained in Example 1 and Comparative Example 1.

The molecular weight and properties of the obtained expandable styrene resin particles were measured, and the results are shown in Table 1. Further, a change in molecular weight from the center toward the surface is shown in FIG. 4.

In addition, a chart (GPC chart) of a surface portion was measured by a GPC method. The chart is shown in FIG. 5(a).

Example 2

After the inside of a 14-liter autoclave equipped with an agitator was substituted with nitrogen at a rate of 500 to 600 ml/min for 30 minutes, 6,000 g of pure water, 9 g of tricalcium phosphate and 0.3 g of sodium dodecylbenzenesulfonate were charged under an agitation of 230 rpm. A hydrogen ion concentration at this time was 8.0.

Subsequently, 5,400 g of styrene, 23.6 g (Wet 75%) of benzoyl peroxide, 2.4 g of t-butyl peroxyisopropylcarbonate, and 3 g of ethylenebisamide were charged under agitation.

After completion of charging, the polymerization vessel was sealed, a pipe for blowing was opened, and then nitrogen was flown at a rate of 200 to 300 ml/min. The vessel was then heated to 90° C., and 3 g of tricalcium phosphate was added 1.5 hours and 2.5 hours after completion of temperature rising, respectively. At these times, rates of polymerization were 39% and 46%, respectively.

Then, upon keeping the content of the vessel at 90° C. for 2 hours, 6 g of tricalcium phosphate and 0.3 g of sodium dodecylbenzenesulfonate were added again. Up to this point, nitrogen was flown continuously. At this time, a rate of polymerization was 96% and the concentration measured was 0.1 vol %. After the concentration of oxygen was measured, the flow of nitrogen was stopped, the pipe for blowing was closed, and then 600 g of styrene was added dropwise continuously over 3 hours while the temperature was raised to 100° C.

The procedures thereafter including impregnation with an expanding agent were repeated in the same way of Example 1.

The molecular weight and properties of the obtained expandable styrene resin particles were measured, and the results are shown in Table 1.

In addition, a chart (GPC chart) of a surface portion was measured by a GPC method. The chart is shown in FIG. 5(b).

Comparative Example 1

The molecular weight and properties of expandable styrene resin particles (trade name: S-HCM-K, product of Shonan Sekisui Kougyo Co., Ltd.) were measured, and the results are shown in Tables 1 and 3. Further, a change in molecular weight from the surface toward the center is shown in FIG. 4.

In addition, a chart (GPC chart) of a surface portion was measured by a GPC method. The chart is shown in FIG. 5(c).

As shown in FIG. 4, the molecular weights of both the particles of Example 1 and Comparative Example 1 were increased from the center toward the surface. However, while the molecular weight of the particles of Comparative Example 1 was increased gradually, the molecular weight of the particles of Example 1 remained almost uniform from the center to ⅗ from the center and became abruptly high near the surface. Thus, it is understood that the molecular weight near the surface of the particles of Example 1 is high while its molecular weight near the center is kept low.

Further, as shown in FIGS. 5(a), 5(b) and 5(c), the GPC charts of the particles of Examples 1 and 2 with an abrupt change in molecular weight had a shoulder. Inflection points are present at these shoulders. The shoulders are formed because the proportion of high molecular weight polymers is high. Meanwhile, in the GPC chart of the particles of Comparative Example 1 showing a gradual change in molecular weight, a small bulge is seen. However, the chart with no inflection points, indicating that no shoulders were formed.

Example 3

In a 14-liter autoclave equipped with an agitator, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 5,400 g of styrene, 20.4 g (Wet 75%) of benzoyl peroxide, 2.4 g of t-butyl peroxyisopropylcarbonate, and 3 g of ethylenebisamide were charged under agitation.

After completion of charging, the polymerization vessel was sealed. The vessel was then heated to 90° C., and 3 g of tricalcium phosphate was added two hours and three hours after completion of temperature rising, respectively. At these times, rates of polymerization were 35% and 44%, respectively.

Then, upon keeping the content of the vessel at 90° C. for 2 hours, 6 g of tricalcium phosphate and 0.3 g of sodium dodecylbenzenesulfonate were added again. A rate of polymerization at this time was 91%. After the inside of the polymerization vessel was substituted with nitrogen at a rate of 200 to 300 ml/min for 10 minutes, the concentration of oxygen was measured. It was 4.8 vol %. Thereafter, 600 g of styrene was added dropwise continuously over 3 hours while the temperature was raised to 100° C.

The remaining procedure of Example 1 including impregnation with an expanding agent was repeated.

The molecular weight and properties of the obtained expandable styrene resin particles were measured, and the results are shown in Table 1.

Example 4

In a 14-liter autoclave equipped with an agitator, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 5,700 g of styrene, 20.4 g (Wet 75%) of benzoyl peroxide, 2.4 g of t-butyl peroxyisopropylcarbonate, and 3 g of ethylenebisamide were charged under agitation.

After completion of charging, the polymerization vessel was sealed. The vessel was then heated to 90° C., and 3 g of tricalcium phosphate was added two hours and three hours after completion of temperature rising. At these times, rates of polymerization were 35% and 44%, respectively.

Then, upon keeping the content of the vessel at 90° C. for 2 hours, 6 g of tricalcium phosphate and 0.3 g of sodium dodecylbenzenesulfonate were added again. A rate of polymerization at this time was 90%. After the inside of the polymerization vessel was substituted with nitrogen at a rate of 200 to 300 ml/min for 10 minutes, the concentration of oxygen measured was 4.5 vol %. Thereafter, 300 g of styrene was added dropwise continuously over 3 hours while the temperature was raised to 100° C.

The procedures thereafter including impregnation with an expanding agent were repeated in the same way of Example 1

The molecular weight and properties of the obtained expandable styrene resin particles were measured, and the results are shown in Table 1.

Example 5

In a 14-liter autoclave equipped with an agitator, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 5,400 g of styrene, 20.0 g (Wet 75%) of benzoyl peroxide, 2.4 g of t-butyl peroxyisopropylcarbonate, and 3 g of ethylenebisamide were charged under agitation. After completion of charging, the polymerization vessel was sealed. The vessel was then heated to 90° C., and 3 g of tricalcium phosphate was added two hours and three hours after completion of temperature rising, respectively. At these times, rates of polymerization were 34% and 43%, respectively.

Then, upon keeping the content of the vessel at 90° C. for 2 hours, 6 g of tricalcium phosphate and 0.3 g of sodium dodecylbenzenesulfonate were added again. A rate of polymerization at this time was 90%. After the inside of the polymerization vessel was substituted with nitrogen at a rate of 200 to 300 ml/min for 10 minutes, the concentration of oxygen was measured. It was 4.0 vol %. Thereafter, 600 g of styrene was added dropwise continuously over 1.5 hours while the temperature was raised to 100° C.

The procedures thereafter including impregnation with an expanding agent were repeated in the same way of Example 1.

The molecular weight and properties of the obtained expandable styrene resin particles were measured, and the results are shown in Table 1.

Example 6

In a 14-liter autoclave equipped with an agitator, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 5,400 g of styrene, 22.4 g (Wet 75%) of benzoyl peroxide, 2.4 g of t-butyl peroxyisopropylcarbonate, and 3 g of ethylenebisamide were charged under agitation. After completion of charging, the polymerization vessel was sealed. The vessel was then heated to 90° C., and 3 g of tricalcium phosphate was added 2 hours and 2.5 hours after completion of temperature rising, respectively. At these times, rates of polymerization were 38% and 43%, respectively.

Then, upon keeping the content of the vessel at 90° C. for 0.5 hours, 6 g of tricalcium phosphate and 0.3 g of sodium dodecylbenzenesulfonate were added again. A rate of polymerization at this time was 61%. After the inside of the polymerization vessel was substituted with nitrogen at a rate of 200 to 300 ml/min for 10 minutes, the concentration of oxygen was measured. It was 4.1 vol %. Thereafter, 600 g of styrene was added dropwise continuously over 5 hours while the temperature was raised to 100° C.

The procedures thereafter including impregnation with an expanding agent were repeated in the same way of Example 1.

The molecular weight and properties of the obtained expandable styrene resin particles were measured, and the results are shown in Table 1.

Example 7

In a 14-liter autoclave equipped with an agitator, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 4,200 g of styrene, 21.7 g (Wet 75%) of benzoyl peroxide, 2.4 g of t-butyl peroxyisopropylcarbonate, and 3 g of ethylenebisamide were charged under agitation. After completion of charging, the polymerization vessel was sealed. The vessel was then heated to 90° C., and 3 g of tricalcium phosphate was added 1.5 hours and 2 hours after completion of temperature rising, respectively. At these times, rates of polymerization were 35% and 40%, respectively.

Then, upon keeping the content of the vessel at 90° C. for 1.5 hours, 6 g of tricalcium phosphate and 0.3 g of sodium dodecylbenzenesulfonate were added again. A rate of polymerization at this time was 96%. After the inside of the polymerization vessel was substituted with nitrogen at a rate of 200 to 300 ml/min for 10 minutes, the concentration of oxygen was measured. It was 3.8 vol %. Thereafter, 1,800 g of styrene was added dropwise continuously over 6 hours while the temperature was raised to 100° C.

The procedures thereafter including impregnation with an expanding agent were repeated in the same way of Example 1.

The molecular weight and properties of the obtained expandable styrene resin particles were measured, and the results are shown in Table 1.

Example 8

In a 14-liter autoclave equipped with an agitator, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 5,400 g of styrene, 22.4 g (Wet 75%) of benzoyl peroxide, 2.4 g of t-butyl peroxyisopropylcarbonate, and 3 g of ethylenebisamide were charged under agitation. After completion of charging, the polymerization vessel was sealed. The vessel was then heated to 90° C., and 3 g of tricalcium phosphate was added 2 hours and 2.5 hours after completion of temperature rising, respectively. At these times, rates of polymerization were 38% and 43%, respectively.

Then, upon keeping the content of the vessel at 90° C. for 0.5 hours, 6 g of tricalcium phosphate and 0.3 g of sodium dodecylbenzenesulfonate were added again. A rate of polymerization at this time was 61%. After the inside of the polymerization vessel was substituted with nitrogen at a rate of 200 to 300 ml/min for 10 minutes, the concentration of oxygen was measured. It was 6.5 vol %. Thereafter, 600 g of styrene was added dropwise continuously over 5 hours while the temperature was raised to 100° C.

The procedures thereafter including impregnation with an expanding agent were repeated in the same way of Example 1.

The molecular weight and properties of the obtained expandable styrene resin particles were measured, and the results are shown in Table 1.

Example 9

(Production of Seeds Comprising Regenerated Styrene Resin Particles)

Foamed styrene articles (foamed article obtained from HIGHBEAD SSB-HX of HITACHI CHEMICAL CO., LTD.) were shrunk by hot air at 220° C. to obtain a shrunk article having an apparent specific gravity of 0.8, a size of 500 mm×400 mm×100 mm and a weight of about 16 kg. The shrunk article was coarse-grained by use of a grinder (trade name: ZA-560 type grinder, product of HORAI CO., LTD.) equipped with a 10-mm screen. The thus obtained coarse grains had a maximum length of about 10 mm and a bulk specific density of 0.65. Then, in a Henschel mixer (product of MITSUI MIIKE KAKOU CO., LTD., FM10B), 2,000 g of the coarse grains, 20 g of talc (product of HAYASHI KASEI CO., LTD., MICROWHITE #5,000) having an average particle diameter of 10 μm, and 0.6 g of ethylenebisstearylamide were charged, and they were mixed at 2,000 rpm for 2 minutes. The coarse grains coated with talc and ethylenebisstearylamide were melt-extruded by use of a 30-mm vented extruder (T-shaped die, width of sheet: 300 mm, thickness of sheet: 1 mm), the sheet being pulled at the substantially same rate as the extrusion rate. Further, before the sheet was cooled and solidified, slits each having a depth of 0.5 mm were made in the sheet at intervals of 1 mm horizontally to the direction of extrusion by use of a roller. After the sheet was cooled and solidified, it was cut into about 10 to 15 cm by use of a cutter. Subsequently, the sheet-like cut pieces of styrene resin obtained were fine-grained by means of a grinder (trade name: VM-16 type grinder, product of ORIENT CO., LTD.) equipped with a 2 mm screen. The fine grains were classified into a range of 0.6 to 1.2 mm by use of a sieve to obtain regenerated styrene resin particles.

The regenerated styrene resin particles had a weight average molecular weight of 169,000 and a specific gravity of 0.91.

(Production of Regenerated Expandable Styrene Resin Particles)

In a 5-liter pressure agitation vessel, 1,900 g of deionized water, 1,100 g of the regenerated styrene resin particles (seeds) obtained, 12.0 g of tricalcium phosphate, and 0.09 g of sodium dodecylbenzenesulfonate were charged, and the mixture was heated to 75° C. under agitation.

Then, 400 g of deionized water and 1.3 g of polyvinyl alcohol were charged into a monomer dispersion vessel and mixed together. To the mixture, 200 g of styrene monomer having 0.2 g of t-butyl peroxide and 3.9 g (Wet %) of benzoyl peroxide dissolved therein was added. The resulting mixture was agitated by use of a homomixer (product of TOKUSHU KIKA KOUGYO CO., LTD.) at 5,800 rpm for 120 seconds to finely disperse the styrene monomers (average diameter of monomer oil drop: 10 to 100 μm). The styrene monomer dispersion was charged into the vessel over 30 minutes, then kept as it was for 60 minutes, and then heated to 90° C.

Thereafter, 900 g of styrene monomers was added continuously at a constant rate (3.0 g/min) over 5 hours. In this case, the pressure agitation vessel was purged with nitrogen to keep the concentration of oxygen at 0.5 to 1 vol %. The content of the styrene monomers at this point was 10% (polymerization rate: 90%).

Then, after 2.2 g of tricalcium phosphate and 0.05 g of sodium dodecylbenzenesulfonate were added, the resulting mixture was heated to 115° C. and kept at the temperature for 2 hours. Then, after the mixture was cooled to 100° C., 90 g of butane (i/n ratio=4/6, which will remain the same in the following description) as an expanding agent was added under pressure twice, and the resulting mixture was kept for 10 hours to impregnate it with the expanding agent.

After cooled to room temperature, regenerated expandable styrene resin particles impregnated were taken out of the vessel and dehydrated to be dried.

Then, the resin particles were classified with a sieve with openings of 0.6 to 1.7 mm, and 0.1 wt % of zinc stearate and 0.1 wt % of hardened castor oil were added to the resulting particles for coating to obtain coated regenerated expandable styrene resin particles.

The molecular weight and properties of the particles were measured, and the results are shown in Table 1.

In the present example, the obtained regenerated expandable styrene resin particles were pre-foamed to 50 ml/g, aged for about 18 hours, and then molded at a molding pressure of 0.08 MPa by use of an expandable styrene resin molding machine VS-300 manufactured by DAISEN KOUGYO CO., LTD. to obtain a molded article having a size of 550 mm×335 mm×150 mm.

Comparative Example 2

In a 14-liter autoclave equipped with an agitator, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 6,000 g of styrene, 20.8 g (Wet 75%) of benzoyl peroxide, 2.4 g of t-butyl peroxyisopropylcarbonate, and 3 g of ethylenebisamide were charged under agitation.

After completion of charging, the polymerization vessel was sealed. The vessel was then heated to 90° C., and 3 g of tricalcium phosphate was added two hours and three hours after completion of temperature rising, respectively. At these times, rates of polymerization were 38% and 44%, respectively.

Then, upon keeping the content of the vessel at 90° C. for 2.5 hours, 6 g of tricalcium phosphate and 0.3 g of sodium dodecylbenzenesulfonate were added again. A rate of polymerization at this time was 95%, and the concentration of oxygen was 18.7 vol %. Thereafter, the mixture was heated to 100° C. over 1 hour.

The procedures thereafter including impregnation with an expanding agent were repeated in the same way of Example 1.

The molecular weight and properties of the obtained expandable styrene resin particles were measured, and the results are shown in Table 1.

ate, and 3 g of ethylenebisamide were charged under agitation. After completion of charging, the polymerization vessel was sealed. The vessel was then heated to 90° C., and 3 g of tricalcium phosphate was added one hour and two hours after completion of temperature rising, respectively. At these times, rates of polymerization were 39% and 48%, respectively.

Then, upon keeping the content of the vessel at 90° C. for 2 hours, 6 g of tricalcium phosphate and 0.3 g of sodium dodecylbenzenesulfonate were added again. A rate of polymerization at this time was 98%, and the concentration of oxygen measured was 19.0 vol %. Thereafter, 300 g of styrene was added dropwise continuously over 1.5 hours while the temperature was raised to 100° C.

The procedures thereafter including impregnation with an expanding agent were repeated in the same way of Example 1.

The molecular weight and properties of the obtained expandable styrene resin particles were measured, and the results are shown in Table 1.

TABLE 1

|  |  | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 | Comp. Ex. 3 |
|---|---|---|---|---|---|---|---|---|---|---|---|---|---|
| Conditions for Polymerization | Rate of Polymerization (wt %) | 95 | 96 | 91 | 90 | 90 | 61 | 96 | 61 | 90 | — | — | 98 |
|  | Concentration of Oxygen in Reaction Vessel (vol %) | 3.1 | 0.1 | 4.8 | 4.5 | 4.0 | 4.1 | 3.8 | 6.5 | 0.5 to 1 | — | 18.7 | 19.0 |
|  | Amount of Additional Styrene Monomers (wt %) | 10 | 10 | 10 | 5 | 10 | 10 | 30 | 10 | 50 | — | 0 | 5 |
| Results of Evaluation | Molecular Weight of Central Portion ($\times 10^4$) | 22.5 | 20.2 | 29.5 | 25.0 | 31.0 | 27.2 | 24.5 | 25.0 | 26.1 | 23.2 | 29.5 | 18.7 |
|  | Molecular Weight of 3/5 Portion from Center ($\times 10^4$) | 22.8 | 20.5 | 29.6 | 25.1 | 31.3 | 27.3 | 24.5 | 25.1 | 28.3 | 26.5 | 29.3 | 18.9 |
|  | Molecular Weight of Surface Portion ($\times 10^4$) | 34.6 | 43.8 | 35.7 | 30.5 | 37.8 | 35.6 | 37.1 | 29.8 | 47.1 | 33.6 | 29.7 | 22.8 |
|  | Molecular Weight of Surface Portion/ Molecular Weight of Central Portion | 1.54 | 2.17 | 1.21 | 1.22 | 1.22 | 1.31 | 1.51 | 1.19 | 1.80 | 1.45 | 1.01 | 1.22 |
|  | Expandability (ml/g) | 70 | 72 | 67 | 70 | 64 | 68 | 69 | 70 | 60 | 70 | 67 | 78 |
|  | Flexural Strength of Molded Article (MPa) | 0.300 | 0.295 | 0.305 | 0.295 | 0.310 | 0.305 | 0.305 | 0.290 | 0.32 | 0.295 | 0.285 | 0.255 |
|  | Inclination of Correlation Expression of Logarithm (R.M.S Radius) and Logarithm (MW) | — | 0.47 | 0.49 | 0.52 | — | — | 0.49 | — | 0.49 | — | 0.56 | 0.58 |
|  | Appearance (Degree of Smoothness of Surface) (%) | — | 93 | 90 | 88 | — | — | 89 | — | 95 | — | 85 | 82 |

Molecular Weight: Weight Average Molecular Weight

Comparative Example 3

In a 14-liter autoclave equipped with an agitator, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 5,700 g of styrene, 24.8 g (Wet 75%) of benzoyl peroxide, 2.4 g of t-butyl peroxyisopropylcarbon- <Examples of Keeping Concentration of Oxygen Low From Start to Late Stage of Polymerization and Adding Additional Monomers While Keeping Concentration of Oxygen at 7 vol % or Lower in Late Polymerization Stage>

Example 10

In a 14-liter autoclave equipped with an agitator, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 5,400 g of styrene, 22.4 g (Wet 75%) of benzoyl peroxide, 2.4 g of t-butyl peroxyisopropylcarbonate, and 3 g of ethylenebisamide were charged under agitation.

After completion of charging, the polymerization vessel was sealed, and a pipe for blowing was opened to perform substitution with nitrogen. The concentration of oxygen at this time was 12 vol %. After completion of the substitution with nitrogen, the pipe for blowing was closed to seal the vessel again. The vessel was then heated to 90° C., and 3 g of tricalcium phosphate was added two hours and three hours after completion of temperature rising, respectively. At these times, rates of polymerization were 40% and 49%, respectively.

Then, when the content of the vessel was kept at 90° C. for 2.5 hours and a polymerization rate of 95% was achieved, 6 g of tricalcium phosphate and 0.3 g of sodium dodecylbenzenesulfonate were added again. The concentration of oxygen at this time was 3.1 vol %. Thereafter, 600 g of styrene was added dropwise continuously over 3 hours while the temperature was raised to 100° C.

Then, 90 g of cyclohexane was added under pressure, and after 1 hour, 420 g of butane (isobutane/normal butane ratio=4/6) was added under pressure in 1 hour, and then the content of the vessel was kept warm for another 4 hours. Thereafter, the content was cooled to room temperature and then taken out of the autoclave.

After the taken out slurry was washed, dehydrated and dried, the resulting product was classified by passing through a 14 mesh and being caught in a 26 mesh and then coated with 0.08% of zinc stearate, 0.05% of castor hardened oil and 0.02% of dimethyl silicone to obtain expandable styrene resin particles.

Figure 6:
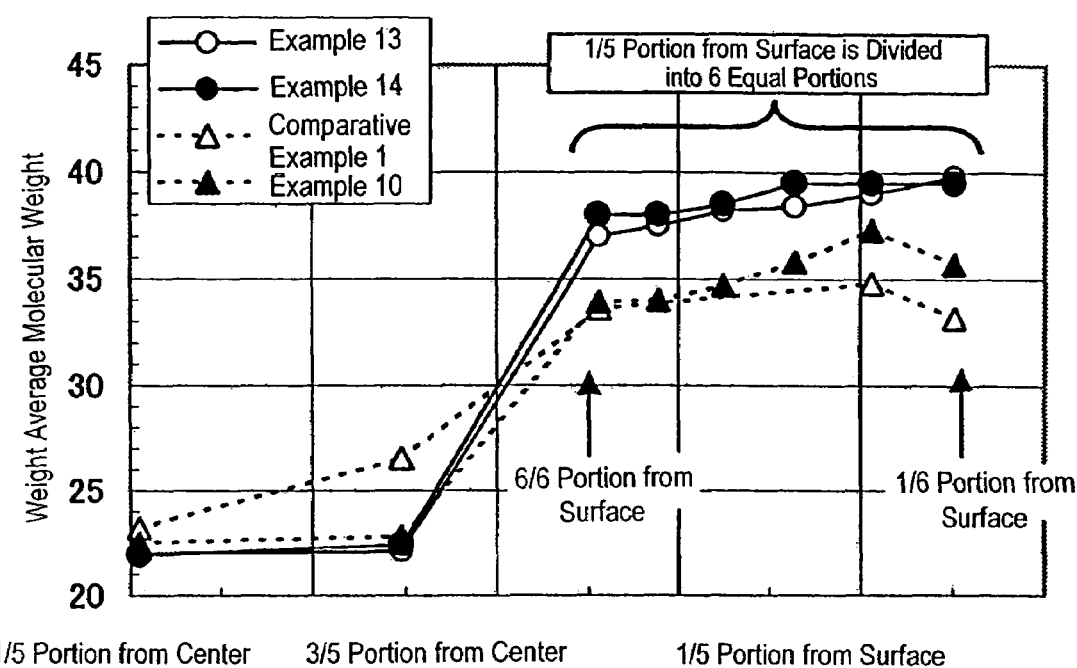
FIG. 6 is a graph showing changes in molecular weights from the center to the surface of particles obtained in Examples 10, 13 and 14 and Comparative Example 1.

The molecular weight and properties of the obtained expandable styrene resin particle were measured, and the results are shown in Table 2. Further, a change in molecular weight from the center toward the surface is shown in FIG. 6.

Example 11

After the inside of a 14-liter autoclave equipped with an agitator was substituted with nitrogen, 6,000 g of pure water, 9 g of tricalcium phosphate and 0.3 g of sodium dodecylbenzenesulfonate were charged under an agitation of 230 rpm. A hydrogen ion concentration at this time was 8.0.

Subsequently, 5,400 g of styrene, 22.4 g (Wet 75%) of benzoyl peroxide, 2.4 g of t-butyl peroxyisopropylcarbonate, and 3 g of ethylenebisamide were charged under agitation.

After completion of charging, the polymerization vessel was sealed, and a pipe for blowing was opened to perform substitution with nitrogen again. When the concentration of oxygen at this time was measured by use of an oximeter, it was 5.4 vol %. The vessel was then heated to 90° C., and 3 g of tricalcium phosphate was added two hours and three hours after completion of temperature rising, respectively. At these times, rates of polymerization were 40% and 49%, respectively.

Then, when the content of the vessel was kept at 90° C. for 2.5 hours and a polymerization rate of 95% was achieved, 6 g of tricalcium phosphate and 0.3 g of sodium dodecylbenzenesulfonate were added again. The concentration of oxygen at this time was 4.8 vol %. Thereafter, 600 g of styrene was added dropwise continuously over 3 hours while the temperature was raised to 100° C.

The procedures thereafter including impregnation with an expanding agent and surface-processing were repeated. in the same way of Example 10.

The molecular weight and properties of the obtained expandable styrene resin particles were measured, and the results are shown in Table 2.

Example 12

In a 14-liter autoclave equipped with an agitator, 6,000 g of pure water, 9 g of tricalcium phosphate and 0.3 g of sodium dodecylbenzenesulfonate were charged under an agitation of 230 rpm. A hydrogen ion concentration at this time was 8.0.

Subsequently, 5,400 g of styrene, 22.4 g (Wet 75%) of benzoyl peroxide, 2.4 g of t-butyl peroxyisopropylcarbonate, and 3 g of ethylenebisamide were charged under agitation.

After completion of charging, the polymerization vessel was sealed, and a pipe for blowing was opened to perform substitution with nitrogen. The concentration of oxygen at this time was 11 vol %. After completion of the substitution with nitrogen, the pipe for blowing was closed to seal the vessel again. The vessel was then heated to 90° C., and 3 g of tricalcium phosphate was added two hours and three hours after completion of temperature rising, respectively. At these times, rates of polymerization were 40% and 49%, respectively.

Then, when the content of the vessel was kept at 90° C. for 2.5 hours and a polymerization rate of 95% was achieved, 6 g of tricalcium phosphate and 0.3 g of sodium dodecylbenzenesulfonate were added. The concentration of oxygen at this time was 5 vol %. Then, after the inside of the vessel was substituted with nitrogen to reduce the concentration of oxygen to 0.5 vol %, 600 g of styrene was added dropwise continuously over 3 hours while the temperature was raised to 100° C.

The procedures thereafter including impregnation with an expanding agent and surface-processing were repeated in the same way of Example 10.

The molecular weight and properties of the obtained expandable styrene resin particles were measured, and the results are shown in Table 2.

TABLE 2

| | | Ex. 10 | Ex. 11 | Ex. 12 |
|---|---|---|---|---|
| Timing of Substitution of Inside of Reaction Vessel with Nitrogen | | Before Start of Polymerization | Before Start of Polymerization | Before Addition of Additional Monomers |
| Concentration of Oxygen in Reaction Vessel | Initial Stage of Polymerization (vol %) | 12.0 | 5.4 | 11.0 |
| | Late Stage of Polymerization (vol %) | 3.1 | 4.8 | 0.5 |

TABLE 2-continued

|  |  | Ex. 10 | Ex. 11 | Ex. 12 |
|---|---|---|---|---|
| Weight Average Molecular Weight | Whole Particle (A) | 293,000 | 295,000 | 300,000 |
|  | 1/5 Portion from Center | 225,000 | 230,000 | 224,000 |
|  | 3/5 Portion from Center | 228,000 | 232,000 | 225,000 |
|  | 6/6 of 1/5 Portion from Surface | 339,000 | 346,000 | 351,000 |
|  | 5/6 of 1/5 Portion from Surface | 340,000 |  |  |
|  | 4/6 of 1/5 Portion from Surface | 347,000 |  |  |
|  | 3/6 of 1/5 Portion from Surface | 358,000 |  |  |
|  | 2/6 of 1/5 Portion from Surface | 373,000 | 352,000 | 372,000 |
|  | 1/6 of 1/5 Portion from Surface (B) | 357,000 | 340,000 | 366,000 |
| (B)/(A) × 100% |  | 122 | 115 | 122 |
| Expandability (ml/g) |  | 70 | 70 | 70 |
| Flexural Strength of Molded Article (MPa) |  | 0.295 | 0.295 | 0.300 |

<Examples of Keeping Concentration of Oxygen at 1 vol % or Lower From Start to Late Stage of Polymerization and Adding Additional Monomers in Late Stage of Polymerization>

Example 13

After the inside of a 14-liter autoclave equipped with an agitator was substituted with nitrogen, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 5,400 g of styrene, 22.4 g (Wet 75%) of benzoyl peroxide, 2.4 g of t-butyl peroxyisopropylcarbonate, and 3 g of ethylenebisamide were charged under agitation.

After completion of charging, the polymerization vessel was sealed, and a pipe for blowing was opened to perform substitution with nitrogen again. When the concentration of oxygen at this time was measured by use of an oximeter, it was 0.6 vol %. After the vessel was heated to 90° C., substitution with nitrogen was performed again to adjust the concentration of oxygen to 0.6 vol %, and 3 g of tricalcium phosphate was added two hours and three hours after completion of temperature rising. At these times respectively, rates of polymerization were 40% and 49%, respectively.

Then, when the content of the vessel was kept at 90° C. for 2.5 hours and a polymerization rate of 95% was achieved, 6 g of tricalcium phosphate and 0.3 g of sodium dodecylbenzenesulfonate were added. The concentration of oxygen at this time was 0.6 vol %. Thereafter, 600 g of styrene was added dropwise continuously over 3 hours while the temperature was raised to 100° C.

The procedures thereafter including impregnation with an expanding agent and surface-processing were repeated in the same way of Example 10.

The molecular weight and properties of the obtained expandable styrene resin particles were measured, and the results are shown in Table 3. Further, a change in molecular weight from the center toward the surface is shown in FIG. 6.

In addition, a chart (GPC chart) of a surface portion was measured by a GPC method. The chart is shown in FIG. 7(a).

Example 14

After the inside of a 14-liter autoclave equipped with an agitator was substituted with nitrogen, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 5,400 g of styrene, 22.4 g (Wet 75%) of benzoyl peroxide, 2.4 g of t-butyl peroxyisopropylcarbonate, and 3 g of ethylenebisamide were charged under agitation.

After completion of charging, the polymerization vessel was sealed, and a pipe for blowing was opened to perform substitution with nitrogen again. When the concentration of oxygen at this time was measured by use of an oximeter, it was 0.9 volt. After the vessel was heated to 90° C., substitution with nitrogen was performed again to adjust the concentration of oxygen to 0.9 volt, and 3 g of tricalcium phosphate was added two hours and three hours after completion of temperature rising, respectively. At these times, rates of polymerization were 40% and 49%, respectively.

Then, when the content of the vessel was kept at 90° C. for 2.5 hours and a polymerization rate of 95% was achieved, 6 g of tricalcium phosphate and 0.3 g of sodium dodecylbenzenesulfonate were added. The concentration of oxygen at this time was 1.0 vol %. Thereafter, 600 g of styrene was added dropwise continuously over 3 hours while the temperature was raised to 100° C.

Then, 90 g of cyclohexane was added under pressure, and after 1 hour, 420 g of butane (isobutane/normal butane ratio=4/6) was added under pressure in 1 hour, and then the content of the vessel was kept for another 4 hours. Thereafter, the content was cooled to room temperature and then taken out of the autoclave.

After the obtained slurry was washed, dehydrated and dried, the resulting product was classified by passing through a 14 mesh and being caught in a 26 mesh and then coated with 0.08% of zinc stearate, 0.05% of castor hardened oil and 0.02% of dimethyl silicone to obtain expandable styrene resin particles.

The molecular weight and properties of the obtained expandable styrene resin particles were measured, and the results are shown in Table 3. Further, a change in molecular weight from the center toward the surface is shown in FIG. 6.

As shown in FIG. 6, the molecular weights of portions near the surfaces of the particles of Examples 13 and 14 did not decrease, while the molecular weights of portions near the surfaces of the particles of Comparative Examples 1 and Example 10 decreased.

Example 15

After the inside of a 14-liter autoclave equipped with an agitator was substituted with nitrogen, 6,000 g of pure water, 9 g of tricalcium phosphate, and 0.3 g of sodium dodecylbenzenesulfonate were charged under an agitation of 230 rpm while feeding nitrogen into the vessel at 300 ml/min. A hydrogen ion concentration at this time was 8.0.

Subsequently, 5,100 g of styrene, 25.6 g (Wet 75%) of benzoyl peroxide, 2.4 g of t-butyl peroxyisopropylcarbonate, and 3 g of ethylenebisamide were charged under agitation.

After completion of charging, the polymerization vessel was sealed, and a pipe for blowing was opened to feed nitrogen into the vessel at 300 ml/min continuously. The concentration of oxygen at this time was 0.1 vol % or lower. When the concentration of oxygen was measured again after the vessel was heated to 90° C., it was 0.1 vol % or lower. After elapses of 1.5 hours and 2.0 hours after completion of temperature rising, 3 g of tricalcium phosphate was added, respectively. At these times, rates of polymerization were 40% and 47%, respectively.

Then, when the content of the vessel was kept at 90° C. for 2.0 hours and a polymerization rate of 95% was achieved, 6 g of tricalcium phosphate and 0.3 g of sodium dodecylbenzenesulfonate were added. The concentration of oxygen at this time was 0.1 vol % or lower. Thereafter, substitution with nitrogen was stopped, the vessel was completely sealed, and 900 g of styrene was added dropwise continuously over 5 hours while the temperature was raised to 100° C.

The procedures thereafter including impregnation with an expanding agent and surface-processing were repeated in the same way of Example 10.

The molecular weight and properties of the obtained expandable styrene resin particles were measured, and the results are shown in Table 3.

In addition, a chart (GPC chart) of a surface portion was measured by a GPC method. The chart is shown in FIG. 7(b).

Further, as shown in FIGS. 7(a), 7(b) and 5(c), the GPC charts of the particles of Examples 13 and 14 with an abrupt change in molecular weight had two crests or shoulders. An inflection point is present at the shoulder. The shoulder is formed since the proportion of high molecular weight polymers is high. Meanwhile, in the GPC chart of the particles of Comparative Example 1 with a gradual change in molecular weight, a small bulge is seen. However, the chart shows no inflection point, indicating that no shoulder was formed.

Example 16

After the inside of a 14-liter autoclave equipped with an agitator was substituted with nitrogen, 6,000 g of pure water, 9 g of tricalcium phosphate and 0.3 g of sodium dodecylbenzenesulfonate were charged under an agitation of 230 rpm with nitrogen fed into the vessel at 300 ml/min. A hydrogen ion concentration at this time was 8.0.

Subsequently, 5,400 g of styrene, 22.4 g (Wet 75%) of benzoyl peroxide, 2.4 g of t-butyl peroxyisopropylcarbonate, and 3 g of ethylenebisamide were charged under agitation.

After completion of charging, the polymerization vessel was sealed, and a pipe for blowing was opened to feed nitrogen into the vessel at 300 ml/min continuously. The concentration of oxygen at this time was 0.7 vol %. After the vessel was heated to 90° C., substitution with nitrogen was performed again to adjust the concentration of oxygen to 0.7 vol %, and 3 g of tricalcium phosphate was added two hours and three hours after completion of temperature rising, respectively. At these times, rates of polymerization were 40% and 49%, respectively.

Then, when the content of the vessel was kept at 90° C. for 2.5 hours and a polymerization rate of 95% was achieved, 6 g of tricalcium phosphate and 0.3 g of sodium dodecylbenzenesulfonate were added again. The concentration of oxygen at this time was 0.4 vol %. Thereafter, substitution with nitrogen was stopped, the vessel was completely sealed, and 600 g of styrene was added dropwise continuously over 3 hours while the temperature was raised to 100° C.

The procedures thereafter including impregnation with an expanding agent and surface-processing were repeated in the same way of Example 10.

The molecular weight and properties of the obtained expandable styrene resin particles were measured, and the results are shown in Table 3.

Comparative Example 4

In a 14-liter autoclave equipped with an agitator, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 6,000 g of styrene, 20 g (Wet 75%) of benzoyl peroxide, 2.4 g of t-butyl peroxyisopropylcarbonate, and 3 g of ethylenebisamide were charged under agitation.

After completion of charging, the polymerization vessel was heated to 90° C., and a pipe for blowing was opened to allow polymerization to proceed. After elapses of 2 hours and 3 hours after completion of temperature rising, 3 g of tricalcium phosphate was added, respectively. At these times, rates of polymerization were 34% and 43%, respectively.

Then, when the content of the vessel was kept at 90° C. for 3.0 hours and a polymerization rate of 95% was achieved, 6 g of tricalcium phosphate and 0.3 g of sodium dodecylbenzenesulfonate were added again. When the concentration of oxygen in the polymerization vessel at this time was measured, it was 13.0 vol %. Thereafter, the vessel was heated to 100° C. over 1 hour.

The procedures thereafter including impregnation with an expanding agent were repeated in the same way of Example 10.

The molecular weight and properties of the obtained expandable styrene resin particles were measured, and the results are shown in Table 3.

TABLE 3

|  |  | Ex. 13 | Ex. 14 | Ex. 15 |
|---|---|---|---|---|
| Timing of Substitution of Inside of Reaction Vessel with Nitrogen | | Before Start of Polymerization | Before Start of Polymerization | Before Start of Polymerization |
| Concentration of Oxygen in Reaction Vessel | Initial Stage of Polymerization (vol %) | 0.6 | 0.9 | 0.1 or Lower |
|  | Late Stage of Polymerization (vol %) | 0.6 | 1.0 | 0.1 or Lower |
| Weight Average Molecular Weight | Whole Particle (A) | 297,000 | 300,000 | 255,000 |
|  | 1/5 Portion from Center | 220,000 | 219,000 | 202,000 |
|  | 3/5 Portion from Center | 221,000 | 224,000 | 205,000 |
|  | 6/6 of 1/5 Portion from Surface | 370,000 | 380,000 | 438,000 |
|  | 5/6 of 1/5 Portion from Surface | 375,000 | 380,000 |  |
|  | 4/6 of 1/5 Portion from Surface | 382,000 | 385,000 |  |
|  | 3/6 of 1/5 Portion from Surface | 384,000 | 395,000 |  |
|  | 2/6 of 1/5 Portion from Surface | 390,000 | 395,000 | 441,000 |
|  | 1/6 of 1/5 Portion from Surface (B) | 398,000 | 395,000 | 446,000 |
| (B)/(A) × 100% | | 134 | 132 | 175 |
| Expandability (ml/g) | | 70 | 70 | 75 |
| Flexural Strength of Molded Article (MPa) | | 0.312 | 0.308 | 0.305 |

|  |  | Ex. 16 | Comp. Ex. 1 | Comp. Ex. 4 |
|---|---|---|---|---|
| Timing of Substitution of Inside of Reaction Vessel with Nitrogen | | Before Start of Polymerization | — | No |
| Concentration of Oxygen in Reaction Vessel | Initial Stage of Polymerization (vol %) | 0.7 | — | 20.8 |
|  | Late Stage of Polymerization (vol %) | 0.4 | — | 13.0 |
| Weight Average Molecular Weight | Whole Particle (A) | 300,000 | 301,000 | 295,000 |
|  | 1/5 Portion from Center | 216,000 | 232,000 | 295,000 |
|  | 3/5 Portion from Center | 216,000 | 265,000 | 293,000 |
|  | 6/6 of 1/5 Portion from Surface | 382,000 | 336,000 | 297,000 |
|  | 5/6 of 1/5 Portion from Surface | 384,000 | 338,000 |  |
|  | 4/6 of 1/5 Portion from Surface | 387,000 | 339,000 |  |
|  | 3/6 of 1/5 Portion from Surface | 394,000 | 340,000 |  |
|  | 2/6 of 1/5 Portion from Surface | 396,000 | 348,000 | 299,000 |
|  | 1/6 of 1/5 Portion from Surface (B) | 405,000 | 332,000 | 295,000 |
| (B)/(A) × 100% | | 135 | 110 | 100 |
| Expandability (ml/g) | | 70 | 70 | 67 |
| Flexural Strength of Molded Article (MPa) | | 0.310 | 0.295 | 0.285 |

<Examples of Keeping Concentration of Oxygen at 7 Vol % or Lower From Start to Late Stage of Polymerization Without Adding Additional Monomers>

Example 17

In a 14-liter autoclave equipped with an agitator, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 6,000 g of styrene, 20.8 g (Wet 75%) of benzoyl peroxide, 2.4 g of t-butyl peroxyisopropylcarbonate, and 3 g of ethylenebisamide were charged under agitation.

After completion of charging, the polymerization vessel was sealed, and a pipe for blowing was opened to feed nitrogen into the vessel. When the concentration of oxygen became 6.5 vol %, the pipe for blowing was closed. After the vessel was heated to 90° C., 3 g of tricalcium phosphate was added two hours and three hours after completion of temperature rising, respectively. At these times, rates of polymerization were 34% and 43%, respectively.

Then, when the content of the vessel was kept at 90° C. for 3 hours, 6 g of tricalcium phosphate and 0.3 g of sodium dodecylbenzenesulfonate were added again. When the concentration of oxygen in the polymerization vessel at this time was measured, it was 5.8 vol %. Thereafter, the vessel was heated to 100° C. over 1 hour.

Then, 90 g of cyclohexane was added under pressure, and after 1 hour, 420 g of butane (isobutane/normal butane ratio=4/6) was added under pressure in 1 hour, and then the content of the vessel was kept for another 4 hours. Thereafter, the content was cooled to room temperature and then taken out of the autoclave.

After the taken out slurry was washed, dehydrated and dried, the resulting product was classified by passing through a 14 mesh and being caught in a 26 mesh and then coated with 0.08% of zinc stearate, 0.05% of castor hardened oil and 0.02% of dimethyl silicone to obtain expandable styrene resin particles (average particle diameter: 0.85 mm).

The molecular weight and properties of the obtained expandable styrene resin particles were measured, and the results are shown in Table 4.

Example 18

Expandable styrene resin particles (average particle diameter: 0.85 mm) were obtained in the same manner as in Example 1 except that nitrogen was fed into a polymerization vessel continuously between completion of charging and completion of polymerization at 90° C. to control the concentration of oxygen in the polymerization vessel to 0.1 vol % or lower.

The molecular weight and properties of the obtained expandable styrene resin particles were measured, and the results are shown in Table 4.

Comparative Example 5

In a 14-liter autoclave equipped with an agitator, 6,000 g of pure water, 9 g of tricalcium phosphate, and 0.3 g of sodium dodecylbenzenesulfonate were charged under an agitation of 230 rpm. A hydrogen ion concentration at this time was 8.0.

Subsequently, 6,000 g of styrene, 20.8 g (Wet 75%) of benzoyl peroxide, 2.4 g of t-butyl peroxyisopropylcarbonate, and 3 g of ethylenebisamide were charged under agitation.

After completion of charging, the vessel was heated to 90° C., and a pipe for blowing was opened to allow polymerization to proceed. The concentration of oxygen in the polymerization vessel at this time was 20.7 vol %. After elapses of 2 hours and 3 hours after completion of temperature rising, 3 g of tricalcium phosphate was added, respectively. At these times, rates of polymerization were 33% and 42%, respectively.

Then, when the content of the vessel was kept at 90° C. for 3 hours, 6 g of tricalcium phosphate and 0.3 g of sodium dodecylbenzenesulfonate were added again. When the concentration of oxygen in the polymerization vessel at this time was measured, it was 15.8 vol %. Thereafter, the vessel was heated to 100° C. over 1 hour. The procedures thereafter including impregnation with an expanding agent were repeated in the same way of Example 1 to obtain expandable styrene resin particles (average particle diameter: 0.85 mm).

The molecular weight and properties of the obtained expandable styrene resin particles were measured, and the results are shown in Table 4.

The invention is based on Japanese Patent Applications Nos. P2002-132623, P2002-132624, P2002-242015, P2002-242016, P2002-280359 and P2002-381173, which are herein incorporated by reference.

It is to be understood by those skilled in the art that the forgoing description relates to preferred embodiments of the invention and that various changes and modifications may be made in the invention without departing from the spirit and scope of the appended claims. Also it is to be understood that the invention is not limited to the embodiments thereof except as defined in the appended claims.

TABLE 4

| | | Ex. 17 | Ex. 18 | Comp. Ex. 5 |
|---|---|---|---|---|
| Conditions for Polymerization | Concentration of Oxygen in Reaction Vessel (After Charging) (vol %) | 6.5 | 0.1 | 20.7 |
| | Concentration of Oxygen in Reaction Vessel (at Completion of Polymerization) (vol %) | 5.8 | 0.1 | 15.8 |
| Results of Evaluation | Weight Average Molecular Weight of Outermost Layer Portion (One Expandable cell) | 301,000 | 306,000 | 295,000 |
| | Weight Average Molecular Weight of Surface Layer Portion (Two Expandable cells) | 298,000 | 299,000 | 299,000 |
| | Appearance (Degree of Smoothness of Surface) (%) | 93 | 96 | 85 |
| | Expandability (ml/g) | 68 | 68 | 68 |

What is claimed is:

1. A process of producing expandable styrene resin particles, comprising;

suspension-polymerizing styrene monomers by using seeds comprising regenerated styrene resin particles and adding styrene monomers, keeping the concentration of oxygen in a reaction vessel at 7 vol % or lower when a polymerization rate is 60% or higher, and impregnating styrene resin particles with an expanding agent before or after completion of the polymerization.

2. An expandable styrene resin particle wherein a material of a cell of an outermost layer portion having a thickness corresponding to the size of one expandable cell has a weight average molecular weight higher than a weight average molecular weight of a material of cells of a surface layer portion having a thickness corresponding to the size of two expandable cells.

* * * * *